United States Patent
Matsuo et al.

(10) Patent No.: US 8,953,207 B2
(45) Date of Patent: Feb. 10, 2015

(54) PRINTING CONTROL APPARATUS, RECORDING MEDIUM HAVING RECORDED THEREON PRINTING CONTROL PROGRAM, AND PRINTING CONTROL METHOD

(71) Applicant: Dainippon Screen Mfg. Co., Ltd., Kyoto (JP)

(72) Inventors: Koji Matsuo, Kyoto (JP); Hiroyuki Segawa, Kyoto (JP); Soichi Kimura, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 18 days.

(21) Appl. No.: 13/781,938

(22) Filed: Mar. 1, 2013

(65) Prior Publication Data

US 2013/0258398 A1   Oct. 3, 2013

(30) Foreign Application Priority Data

Mar. 27, 2012   (JP) ................. 2012-071071

(51) Int. Cl.
*G06K 15/02* (2006.01)
*G06F 3/12* (2006.01)
*H04N 1/46* (2006.01)

(52) U.S. Cl.
CPC .......... *G06K 15/1801* (2013.01); *G06F 3/1243* (2013.01); *G06F 3/1256* (2013.01); *G06F 3/1285* (2013.01); *G06F 3/1212* (2013.01)
USPC ........... 358/1.15; 358/1.1; 358/501; 358/401; 358/1.9

(58) Field of Classification Search
CPC ................................................ G06K 15/1801
See application file for complete search history.

(56) References Cited

U.S. PATENT DOCUMENTS

| | | | | |
|---|---|---|---|---|
| 6,844,940 B2 * | 1/2005 | Warmus et al. | ............... | 358/1.18 |
| 2003/0237054 A1 * | 12/2003 | Donahue | ........................ | 715/525 |
| 2009/0147288 A1 * | 6/2009 | Matsuda | ........................ | 358/1.9 |
| 2011/0255103 A1 * | 10/2011 | Matsuda | ........................ | 358/1.9 |
| 2012/0057198 A1 * | 3/2012 | Yabe | ........................... | 358/1.15 |

FOREIGN PATENT DOCUMENTS

| | | |
|---|---|---|
| JP | 2005-085180 | 3/2005 |
| JP | 2006-172203 A | 6/2006 |
| JP | 2010-066987 | 3/2010 |

OTHER PUBLICATIONS

Japan Patent Office English machine translation of JP 2006-172203 A.
Japanese English translation by Thomson Scientific of JP 2006-172203 A.

* cited by examiner

*Primary Examiner* — Beniyam Menberu
(74) *Attorney, Agent, or Firm* — Ostrolenk Faber LLP

(57) ABSTRACT

A preflight check unit in a printing control apparatus includes a sub-preflight check unit, an object page determination unit, a main preflight check unit, and a preflight result output unit. The sub-preflight check unit obtains resource use information and part use information. The object page determination unit determines object pages to be subjected to the preflight check, based on the resource use information and the part use information, and writes object page information indicating the object pages in a storage unit. The main preflight check unit reads the object page information from the storage unit to perform preflight check on the object pages indicated by the object page information. The preflight result output unit outputs a preflight result.

9 Claims, 12 Drawing Sheets

Fig.8

RESOURCE USE INFORMATION

PART USE INFORMATION

```
TotalPage=20000
TotalForm=279
TotalImage=1762
ScanNestLevel=3

SerialNumber=1
XObjectID=8
XObjectType=Form
RecycleCount=1
XObjectSize=263032
XObjectWidth=586
XObjectHeight=449
UsePageNum=1
ExceCountList=[1 1]
ParentXObjectNum=0

SerialNumber=2
XObjectID=9
XObjectType=Form
RecycleCount=100
XObjectSize=248171
XObjectWidth=574
XObjectHeight=432
UsePageNum=100
ExceCountList=[1 1] [3 1] [5 1] [7 1] [9 1] [11 1] [13 1] [15 1]
              [17 1] [19 1] ...
ParentXObjectNum=100
ParentXObjectList=[8 1] [986 1] [1024] [2759 1] [4338 1] [4436 1]
                  [4459 1] [4523 1] [4560 1] [4597 1] ...

REST IS OMITTED
```

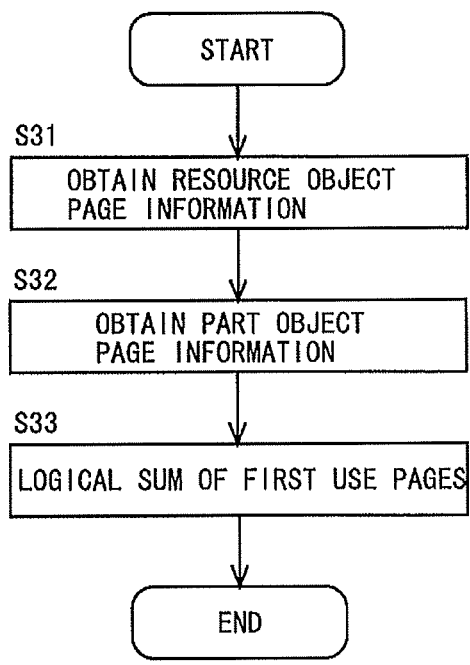

Fig.12

PART OBJECT PAGE INFORMATION

```
Characteristic Page   count=40
1 2 4 6 8 10 12 14 16 18 20 22 26 28 30 32 34 37 38 40 42 44 46 50 62 73
74 76 86 88 90 92 94 98 110 121 122 126 128 134
```

Fig.13

PART RELATED INFORMATION

```
[XO ID]  (F)  PageRC  AllRC   Size  Parent Nest
[260]    (1),  100,    100, 289488,    0,   0
[978]    (1),  100,    100, 289488,    0,   0
[9]      (1),  100,    100, 248171,  100,   1
[11]     (1),  100,    100,  16392,  100,   1
[13]     (1),  100,    100,  11214,  100,   1
[12]     (1),  100,    100,   3738,  100,   1
[234]    (0),  100,    100,   1762,    1,   2
[88]     (0),   94,     94,   3516,    4,   2
[73]     (0),   94,     94,   1663,    4,   2

REST IS OMITTED
```

PRINTING CONTROL APPARATUS, RECORDING MEDIUM HAVING RECORDED THEREON PRINTING CONTROL PROGRAM, AND PRINTING CONTROL METHOD

BACKGROUND OF THE INVENTION

1. Field of the Invention

The present invention relates to a printing control apparatus, and particularly to a printing control apparatus, a recording medium having recorded thereon a printing control program and a printing control method to perform preflight check of manuscript data.

2. Description of Background Art

A printing system is generally made up of a printing control apparatus and a printer. The printing control apparatus receives manuscript data from an external Personal Computer (PC). The manuscript data is created by editing and laying out a part to be used in each page, and described in Page Description Language (PDL). The printing control apparatus applies rasterizing processing (hereinafter, referred to as "RIP processing") by a Raster Image Processor (RIP) to the received manuscript data to create printing output data. The printing output data is transmitted to the printer. The printer outputs a printed material, based on the received printing output data. In printing industry, speeding-up of the processing by the above-described printing system has been required for reduction in printing cost.

Conventionally, as one form of on-demand printing in which upon receiving a request, printing is performed, variable printing has been known. In the variable printing, a different printed material on a basis of a record made up of one or more pages is outputted. That is, the manuscript data received by the printing control apparatus in the variable printing (hereinafter, referred to as "variable manuscript data") is made up of a plurality of records. For example, one record corresponds to a printed material regarding one customer (e.g., a ledger sheet, a bill, a direct mail or the like). Here, a content of each page (content) is implemented, using a resource that the page has. The "content" is made up of a character, a pictorial figure, an image, and a form. The "resource" is a generic term of color information and font information.

Moreover, in the printing control apparatus, generally, in order to avoid a failure of printing, whether or not the manuscript data has an error is checked (preflight check), and the checking is performed before the RIP processing or the like. In the preflight check, for example, error detection for various types of information such as a font, a page size, a color, and a resolution (hereinafter, referred to as "check object information") is performed. As a result of the preflight check, when it is determined that there is no problem with the printing, a printed material is outputted. This preflight check is widely known, and for example, has been described in Japanese Patent Application Laid-Open Publication No. 2010-66987, Japanese Patent Application Laid-Open Publication No. 2005-85180 and the like.

The number of pages of the manuscript data in the foregoing variable printing is generally several ten thousands to several hundred thousands pages, which is enormous. Accordingly, the preflight check cannot be performed to all pages (P1 to Pn), for example, as shown in FIG. 14, or it takes long time to perform the preflight check to all the pages (P1 to Pn). This contributes to an increase in printing cost.

SUMMARY OF THE INVENTION

An object of the present invention is to provide a printing control apparatus, a recording medium having recorded thereon a printing control program, and a printing control method that enables preflight check to be performed at higher speed than that in the related art in variable printing.

To achieve the above-described object, the present invention has the following features.

One aspect of the present invention relates to a printing control apparatus for performing preflight check on manuscript data made up of a plurality of pages in variable printing, the apparatus comprising:

a use information obtainment unit for obtaining first use information indicating pages in which a reusable part in the manuscript data is used, the reusable parts being each an image or a form, and second use information indicating pages having the same resource content in the manuscript data;

an object page determination unit for determining object pages to be subjected to the preflight check from the plurality of pages, based on the first use information and the second use information;

an object page check unit for performing the preflight check on the object pages; and an output unit for outputting a result of the preflight check.

According to the above-described configuration, among all pages of the variable manuscript data, the preflight check is performed on the object pages obtained, based on the first use information indicating the pages in which the reusable part is used, and the second use information indicating the pages having the same resource content. Thus, the preflight check of the reusable parts and resources used in the object pages can be performed while reducing the number of the pages to be subjected to the preflight check as compared with that in the related art. This enables the preflight check to be performed at higher speed than that in the related art.

In the above-described apparatus, it is preferable that the object page determination unit sets, as the object pages, a union of any page that one of the parts indicated by the first use information is used, and any page that one of the resources indicated by the second use information is used.

According to the above-described configuration, by setting, as the object pages, the union of any page that one of the parts is used, and any page that one of the resources is used, advantages similar to that of the above-described configuration can be brought about.

In the above-described apparatus, it is preferable that the object page determination unit sets, as the object pages, a union of a page in which one of the parts indicated by the first use information is first used, and a page in which one of the resources indicated by the second use information is first used.

According to the above-described configuration, the union of the page in which one of the parts is first used, and the page in which one of the resources is first used is the object pages. Since in a first half of records (particularly, a first record or the like), both the resources and the parts are often first used, the pages in which the reusable parts are first used, and the pages in which the reusable resources are first used overlap each other. Thus, as compared with the above-described configuration, the number of the object pages of the preflight check can be reduced. This can achieve further speeding-up of the preflight check.

Another aspect of the present invention relates to a computer-readable recording medium having recorded thereon a printing control program, when executed using a memory by a CPU of a computer for performing preflight check on manuscript data made up of a plurality of pages in variable printing, causing the CPU to perform:

a use information obtainment step of obtaining first use information indicating pages in which a reusable part in the manuscript data is used, the reusable parts being each an image or a form, and second use information indicating pages having the same resource content in the manuscript data;

an object page determination step of determining object pages to be subjected to the preflight check from the plurality of pages, based on the first use information and the second use information;

an object page check step of performing the preflight check on the object pages; and an output step of outputting a result of the preflight check.

In the above-described recording medium, it is preferable that in the object page determination step, as the object pages, a union of any page that one of the parts indicated by the first use information is used, and any page that one of the resources indicated by the second use information is used is set.

In the above-described recording medium, it is preferable that in the object page determination step, as the object pages, a union of a page in which one of the parts indicated by the first use information is first used, and a page in which one of the resources indicated by the second use information is first used is set.

Still another aspect of the present invention relates to a printing control method for performing preflight check on manuscript data made up of a plurality of pages in variable printing, the method comprising:

a use information obtainment step of obtaining first use information indicating pages in which a reusable part in the manuscript data is used, the reusable parts being each an image or a form, and second use information indicating pages having the same resource content in the manuscript data;

an object page determination step of determining object pages to be subjected to the preflight check from the plurality of pages, based on the first use information and the second use information;

an object page check step of performing the preflight check on the object pages; and an output step of outputting a result of the preflight check.

These and other object, characteristics, aspects and advantages of the present invention will be more apparent from the following detailed description of the present invention with reference to the accompanied drawings.

BRIEF DESCRIPTION OF THE DRAWINGS

FIG. 8 is a diagram showing one example of resource use information in the embodiment;

FIG. 10 is a diagram showing one example of part use information in the embodiment;

FIG. 11 is a flowchart showing one example of a procedure of object page information obtaining processing in the embodiment;

FIG. 12 is a diagram showing one example of part object page information in the embodiment;

FIG. 13 is a diagram showing one example of part related information in the embodiment.

DESCRIPTION OF PREFERRED EMBODIMENTS

<1. Overall Configuration>

Figure 1:
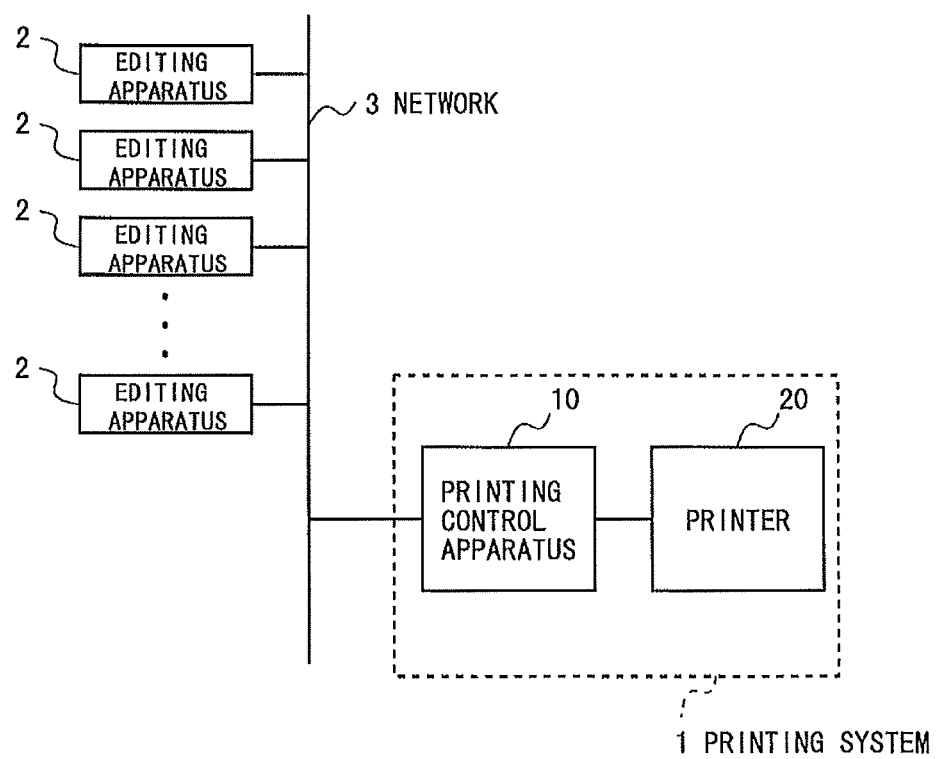
FIG. 1 is a block diagram showing an overall configuration of a printing system and apparatuses related to the same in one embodiment of the present invention.

FIG. 1 is a block diagram showing an overall configuration of a printing system according to one embodiment of the present invention, and apparatuses related to the same. A printing system 1 according to the present embodiment performs variable printing. The printing system 1 includes a printing control apparatus 10 and a printer 20. The printing control apparatus 10 and the printer 20 are connected to each other through a communication line. A plurality of editing apparatuses 2 are connected to the printing control apparatus 10 through a network 3. The network 3 may be either of the internet or Local Area Network (LAN). The printing control apparatus 10 and the editing apparatuses 2 may be connected to one another not through the network 3 but through a communication line or the like.

The editing apparatuses 2 are typically PCs. The editing apparatuses 2 are used to create variable manuscript data. The variable manuscript data is created by editing and laying out a part to be used at each page. This editing processing is performed, using, for example, DeskTop Publishing (DTP) software or the like. The variable manuscript data is data described in PDL. As the PDL, for example, PostScript (registered trademark of Adobe Systems Incorporated) is used. The variable manuscript data created in each of the editing apparatuses 2 is transmitted to the printing control apparatus 10 through the network 3. While in FIG. 1, the plurality of editing apparatuses 2 are connected to the network 3, a single editing apparatus 2 may suffice.

The printing control apparatus 10 applies preflight check processing, RIP processing and the like to the variable manuscript data received through the network 3 to generate printing output data. The variable manuscript data to be processed in the printing control apparatus 10 is obtained by integrating the variable manuscript data transmitted from the plurality of editing apparatuses 2. The printing output data generated by the printing control apparatus 10 is transmitted to the printer 20 through the communication line.

The printer 20 outputs a printed material, based on the printing output data received through the communication line. The printer 20 is, for example, an ink-jet printer or the like. In FIG. 1, while the one printer 20 is connected to the printing control apparatus 10, the present invention is not limited thereto. A plurality of printers 20 may be connected to the printing control apparatus 10.

<2. Configuration of Printing Control Apparatus>

Figure 2:
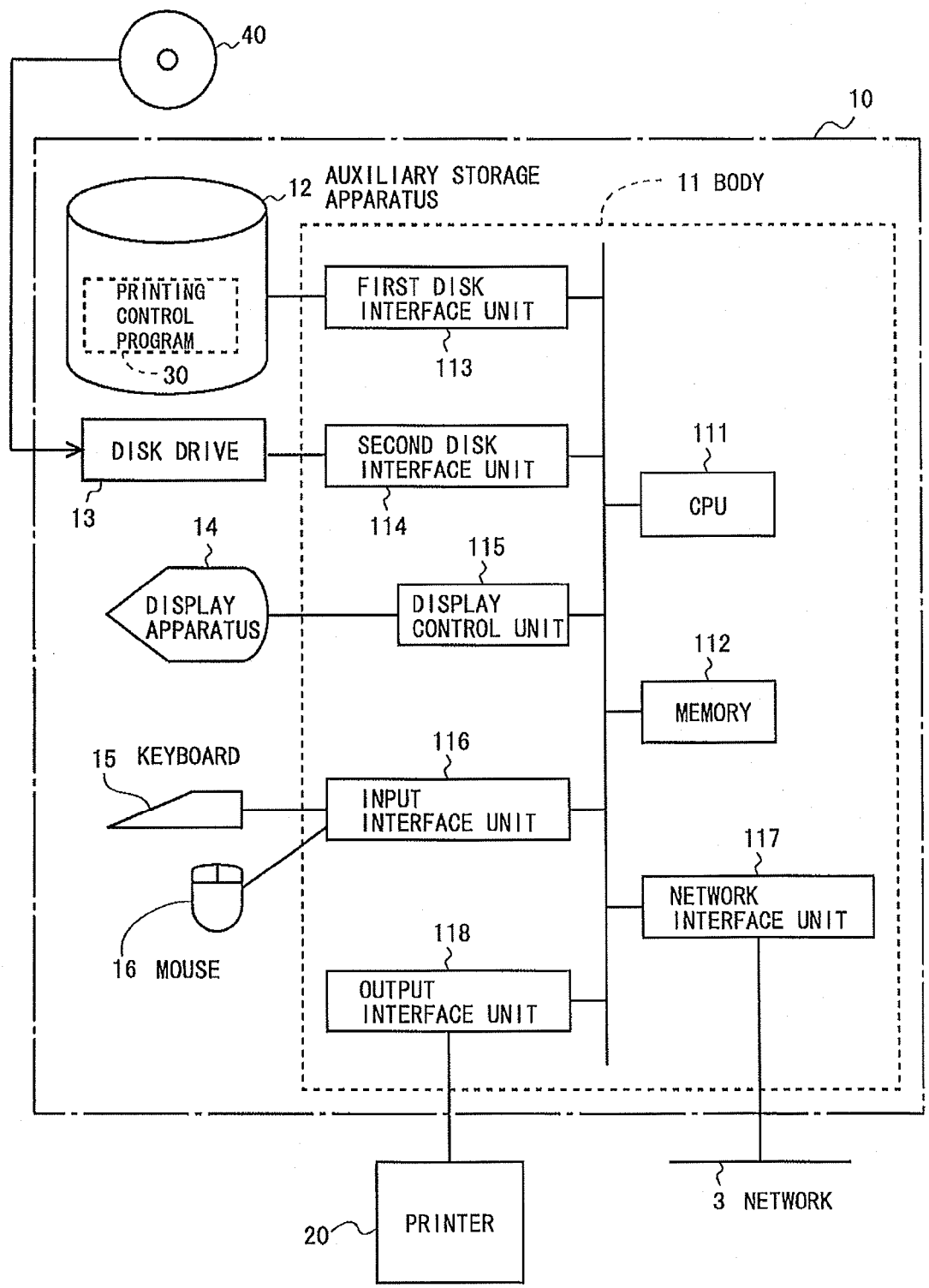
FIG. 2 is a diagram showing a hardware configuration of the printing control apparatus in the embodiment.

FIG. 2 is a diagram showing a hardware configuration of the printing control apparatus 10 in the present embodiment. As shown in FIG. 2, the printing control apparatus 10 includes a body 11, an auxiliary storage apparatus 12, a disk drive 13, a display apparatus 14, a keyboard 15, a mouse 16 and the like. The body 11 includes a CPU 111, a memory 112, a first disk interface unit 113, a second disk interface unit 114, a display control unit 115, an input interface unit 116, a network interface unit 117, and an output interface unit 118. The CPU 111, the memory 112, the first disk interface unit 113, the second disk interface unit 114, the display control unit 115, the input interface unit 116, the network interface unit 117 and the output interface unit 118 are connected to one another through a system bus. The auxiliary storage apparatus 12 is connected to the first disk interface unit 113. The disk drive 13 is connected to the second disk interface unit 114. The display apparatus 14 is connected to the display control unit 115. The keyboard 15 and the mouse 16 are connected to the input interface unit 116. The network 3 is connected to the network interface unit 117. The printer 20 is connected to the output interface unit 118 through the communication line. The auxiliary storage unit 12 is a magnetic disk apparatus or the like. A computer-readable recording medium such as a CD-ROM 40 and the like is inserted into the disk drive 13. Not only CD-ROM 40 but also a CD-R/RW or the like can also be inserted into the disk drive 13, as described later. The display apparatus 14 is a liquid crystal display or the like. The display apparatus 14 is used for an operator to display desired information. The keyboard 15 and the mouse 16 are used for the operator to input an instruction to the printing control apparatus 10.

In the auxiliary storage apparatus 12, a program 30 for printing control processing (hereinafter, referred to as a "printing control program") in the present embodiment is stored. The CPU 111 controls the overall printing control apparatus 10. The CPU 111 executes, in the memory 112, the printing control program 30 stored in the auxiliary storage apparatus 12, by which various functions of the printing control apparatus 10 are implemented. The memory 112 includes a Random Access Memory (RAM) and a Read Only Memory (ROM). The memory 112 functions as a work area for the CPU 111 to execute the printing control program 30 stored in the auxiliary storage apparatus 12. The printing control program 30 is stored, for example, in the CD-ROM 40 or the like to be provided. That is, a user buys the CD-ROM 40 or the like as the recording medium of the printing control program 30 and inserts the same into the disk drive 13 to read the printing control program 30 from the CD-ROM 40 and install the same on the auxiliary storage apparatus 12. Alternatively, the printing control program 30 transmitted through the network 3 may be received to be installed on the auxiliary storage apparatus 12.

Figure 3:
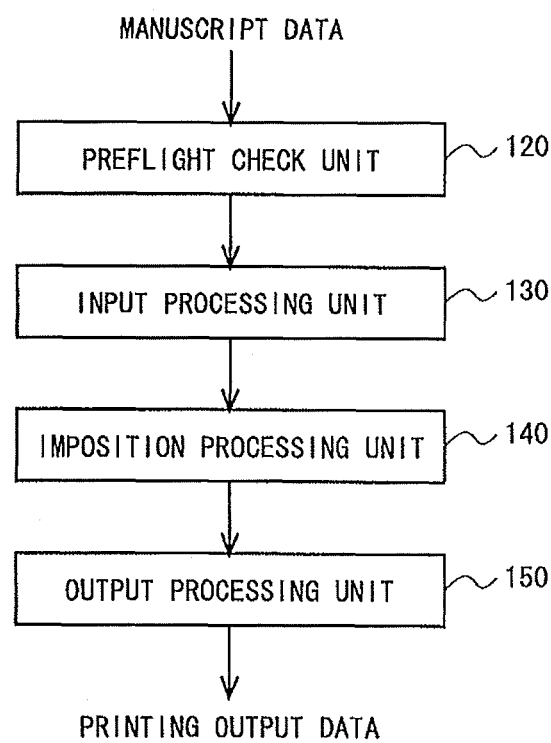
FIG. 3 is a block diagram showing a configuration when a substantial part of the printing control apparatus in the embodiment is seen from a functional view point.

FIG. 3 is a block diagram showing a functional configuration of a substantial part of the printing control apparatus 10 in the present embodiment. As shown in FIG. 3, the printing control apparatus 10 includes a preflight check unit 120, an input processing unit 130, an imposition processing unit 140, and an output processing unit 150. The preflight check unit 120, the input processing unit 130, the imposition processing unit 140 and the output processing unit 150 are implemented as a result of execution of the printing control program 30 by the CPU 111 in the memory 112.

The preflight check unit 120 performs preflight check on the variable manuscript data. Details of the preflight check unit 120 will be described later. The input processing unit 130 performs correction of the variable manuscript data and the like, based on an instruction from the operator given in accordance with a result of the preflight check or the like. The imposition processing unit 140 performs imposition processing for setting arrangement of each page. The output processing unit 150 applies the RIP processing to the variable manuscript data after the imposition processing to generate the printing output data in a bitmap format in accordance with an output resolution of the printer 20. Since the variable manuscript data is described in PDL as described above, the printer 20 cannot perform printing in the format as it is. Thus, the RIP processing allows the printable printing output data in the bitmap format to be generated.

<3. Configuration of Variable Manuscript Data>

Figure 4:
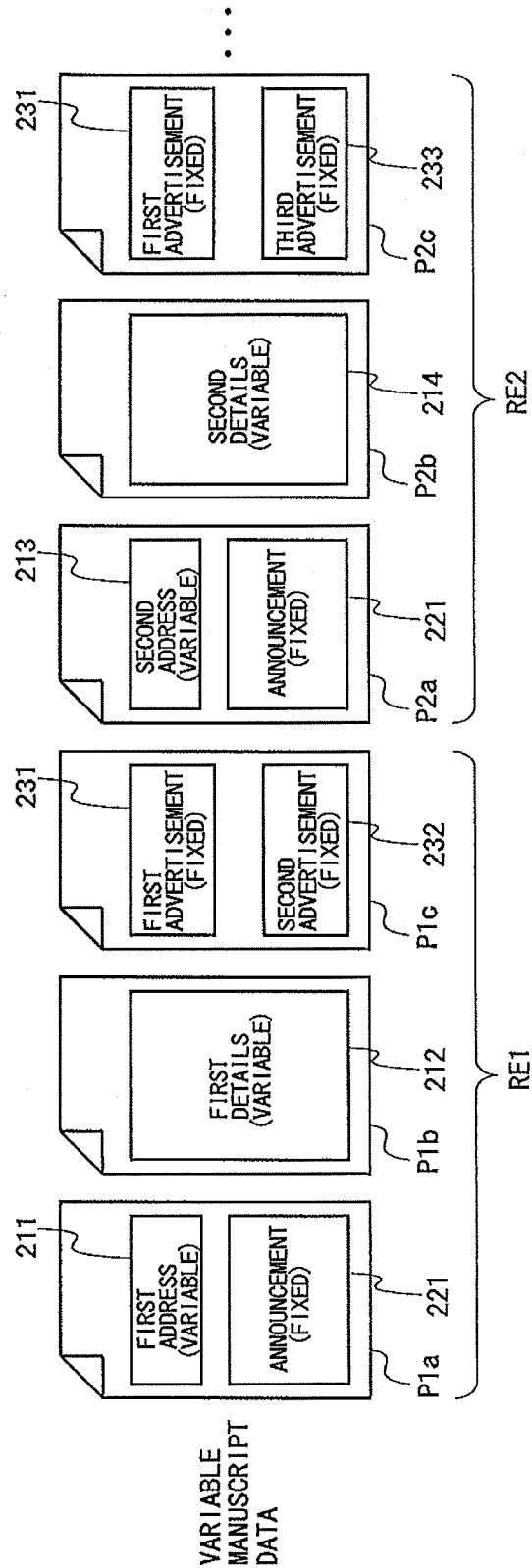
FIG. 4 is a diagram schematically showing a configuration of variable manuscript data in the embodiment.

FIG. 4 is a diagram schematically showing a configuration of the variable manuscript data in the present embodiment. The manuscript data shown in FIG. 4 relates to, for example, a bill. The variable manuscript data is made up of a plurality of records.

In FIG. 4, for convenience, only first and second records RE1, RE2 each made up of 3 pages are shown. An actual total number of pages of the variable manuscript data reaches, for example, several ten thousands pages or several hundred thousands pages. The first record RE1 is made up of pages P1a to P1c, and the second record RE2 is made up of pages P2a to P2c. The 3 pages making up each of the records are different from one another in some or all of parts thereof.

As the part as a content, there are two types: a part whose content is different on a basis of the record (hereinafter, referred to as a "variable part"), and a part usable in variable manuscript data a plurality of times, that is, reusable part (hereinafter, referred to as a "fixed part"). In the example shown in FIG. 4, there are two types of variable parts, particularly, an address and details. In the case where various variable parts include characters, the contents indicated by the characters are different on a basis of the record, while a character size, a font, a color and the like are basically the same among the plurality of records. In the fixed part, there are two types of a form and an image. The "form" is a part that can have the same content as the page, and a character, a pictorial figure, an image, and a form can be described in the content of the form.

In the first page P1a of the first record RE1, a first address 211 of the variable part and an announcement 221 of the fixed part are used. The first address 211, being a part specific to the first record RE1, is not included in the other record. In the second page P1b of the first record RE1, first details 212 of the variable part are used. The first details 212, being a part specific to the first record RE1, are not included in the other record. In the third page P1c of the first record RE1, first and second advertisements 231, 232 of the fixed parts are used.

In the first page P2a of the second record RE2, a second address 213 of the variable part and the announcement 221 of the fixed part are used. The second address 213, being a part specific to the second record, is not included in the other record. In the second page P2b of the second record RE2, second details 214 of the variable part are used. The second details 214, being a part specific to the second record RE2, are not included in the other record. In the third page P2c of the second record RE2, the first and third advertisements 231, 233 of the fixed parts are used.

Among the plurality of records, the same type of part is used in the corresponding same pages. That is, in the first and second records RE1, RE2, the addresses and the announcement are used in the first pages, the details are used in the second pages, and the two advertisements are used in the third pages. The announcement 221 and the first advertisement 231 used in the first record RE1 are reused in the second record RE2. The second advertisement 232 is not reused in the second record RE2, and the third advertisement 233 is instead used. Moreover, although not shown in FIG. 4, the resources can be reused. For example, a first resource used in the first page P1a of the first record RE1, a second resource used in the second page P1b, and a third resource used in the third page P1c can be reused in the first to third pages P2a to P2c of the second record RE2, respectively. In this manner, in the variable manuscript data, some or all of the parts of each of the pages can be reused. Similarly, in the variable manuscript data, the resource of each of the pages can be reused.

<4. Configuration of Preflight Check Unit>

Figure 5:
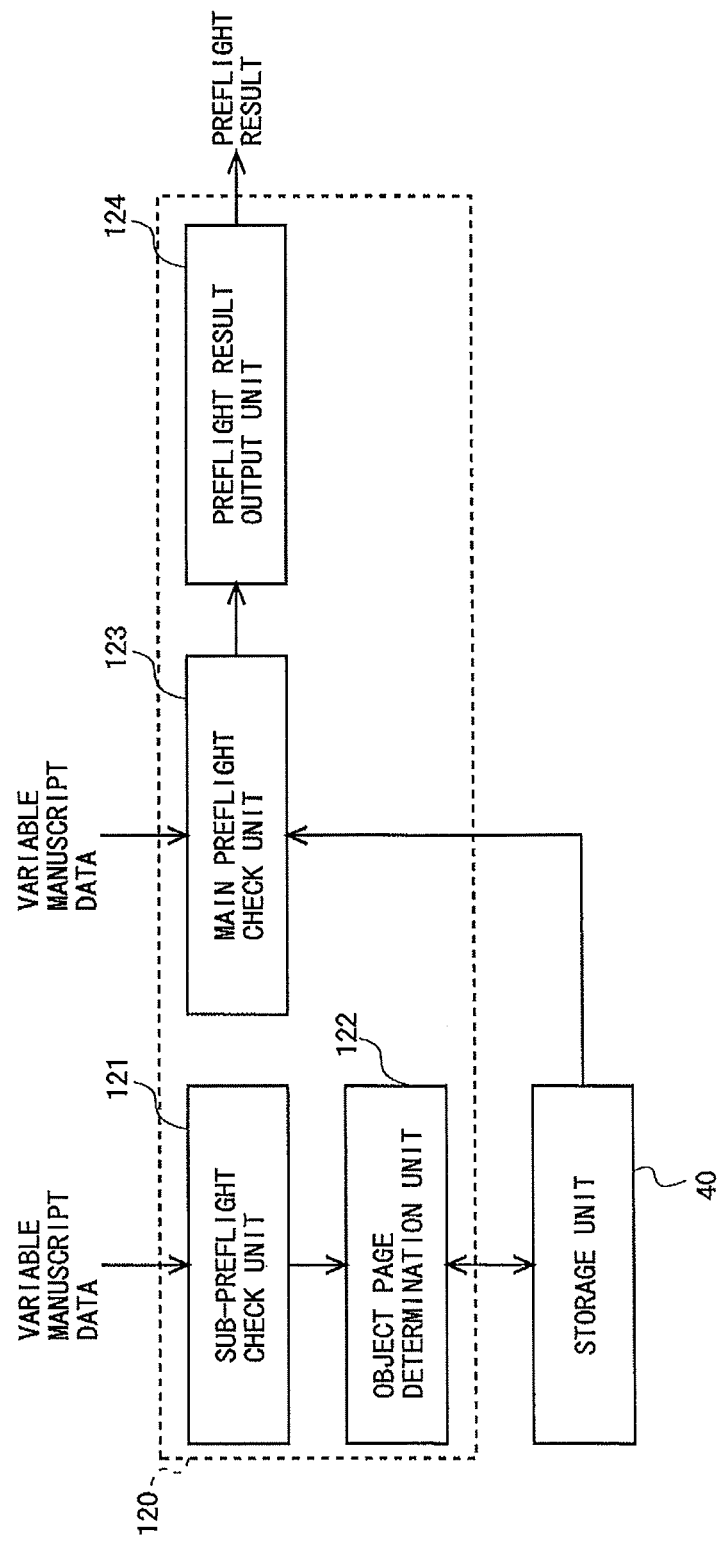
FIG. 5 is a block diagram for describing a configuration of the preflight check unit in the embodiment.

FIG. 5 is a block diagram for describing a configuration of the preflight check unit 120 in the present embodiment. As shown in FIG. 5, the preflight check unit 120 includes a sub-preflight check unit 121, an object page determination unit 122, a main preflight check unit 123, and a preflight result output unit 124. In the present embodiment, a use information obtainment unit is implemented by the sub-preflight check unit 121, and an object page check unit is implemented by the main preflight check unit 123.

The sub-preflight check unit 121 obtains information regarding use of the resources in the variable manuscript data (hereinafter, referred to as "resource use information"), information regarding use of the parts (particularly, the fixed parts) in the variable manuscript data (hereinafter, referred to as "part use information"). In the present embodiment, the part use information corresponds to first use information, and the resource use information corresponds to second use information. Detailed operation of the sub-preflight check unit 121 will be described later.

The object page determination unit 122 determines object pages to be subjected to the preflight check, based on content use information to write object page information indicating the object pages in the storage unit 40. The storage unit 40 may be the memory 112, an auxiliary storage apparatus 12, or a recording medium such as a CD-R/RW inserted into the disk drive 13. Detailed operation of the object page determination unit 122 will be described later.

The main preflight check unit 123 reads the object page information from the storage unit 40 to perform the preflight check to the object pages indicated by the object page information. This preflight check is similar to that in the related art, in which error detection of the check object information is performed.

The preflight result output unit 124 outputs an execution result of the preflight check (hereinafter, referred to as a "preflight result"). The outputted preflight result is displayed, for example, on the display apparatus 14. This allows the operator to visually confirm the preflight result. The preflight result may be written in the auxiliary storage apparatus 12, the recording medium such as the CD-R/RW inserted in the disk drive 13.

The various types of processing by the sub-preflight check unit 121, the object page determination unit 122, the main preflight check unit 123, and the preflight result output unit 124 are automatically performed, for example, once the printing control apparatus 10 receives the variable manuscript data. The display to start the processing may be performed on the display apparatus 14, and the processing may be started in response to an instruction of the operator.

<5. Sub-preflight Check>

Figure 6:
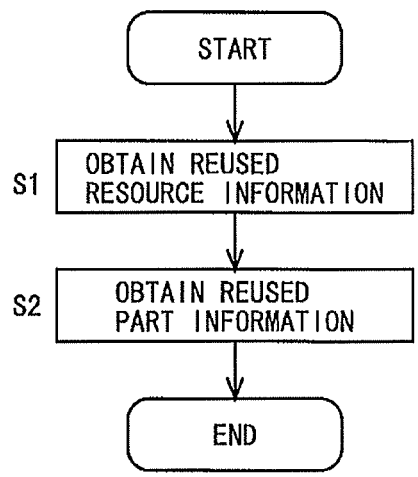
FIG. 6 is a flowchart showing one example of a processing procedure of the sub-preflight check in the embodiment.

FIG. 6 is a flowchart showing one example of a processing procedure of the sub-preflight check in the present embodiment. The procedure of the sub-preflight check is made up of steps S1, S2.

In the sub-preflight check, processing for obtaining the resource use information (hereinafter, referred to as "resource use information obtaining processing") is first performed (step S1). Next, processing for obtaining the part use information (hereinafter, referred to as "part use information obtaining processing") is performed (step S2). The order of the resource use information obtaining processing and the part use information obtaining processing may be reverse.

Moreover, the resource use information obtaining processing and the part use information obtaining information may be performed in parallel.

<5.1 Resource Use Information Obtaining Processing>

Figure 7:
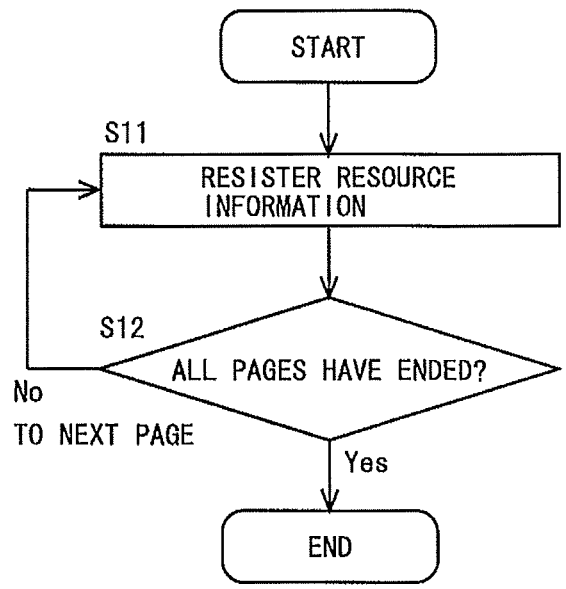
FIG. 7 is a flowchart showing one example of a procedure of resource use information obtaining processing in the embodiment.

FIG. 7 is a flowchart showing one example of a procedure of the resource use information obtaining processing in the present embodiment. In the resource use information obtaining processing, the resource to be used in the page is analyzed in each of the pages, and the information of the analyzed resource is registered (step S11). Specifically, the information indicating the content of the resource and a number of the page where the resource is used is registered. This registration is performed, for example, by storing the information of the analyzed resource in the storage unit 40.

When the information of the resource is analyzed in all the pages, the resource use information obtaining processing ends, and when the information is not analyzed, the information of the resource in the next page is analyzed (step S12).

Figure 8:
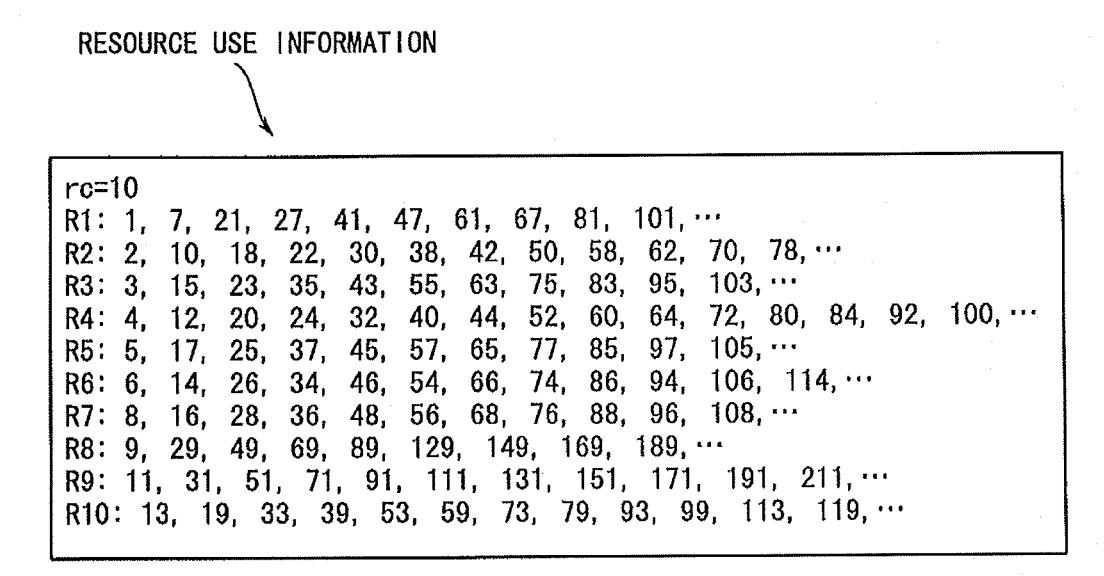

FIG. 8 is a diagram showing one example of the resource use information obtained by the resource use information obtaining processing. A character "rc" indicates a number of types of the resources used in the variable manuscript data. Here, the number of types of the resources is 10. Characters "RY" (Y=1 to 10) indicate numbers of the pages where the Y-th resource is used.

The first resource is used in 1st, 7th, 21st, 27th, 41st, 47th, 61st, 67th, 81st, 101st, . . . pages. The second resource is used in 2nd, 10th, 18th, 22nd, 30th, 38th, 42nd, 50th, 58th, 62nd, 70th, 78th, . . . pages. The third resource is used in 3rd, 15th, 23rd, 35th, 43rd, 55th, 63rd, 75th, 83rd, 95th, 103rd, . . . pages. The fourth resource is used in 4th, 12th, 20th, 24th, 32nd, 40th, 44th, 52nd, 60th, 64th, 72nd, 80th, 84th, 92nd, 100th, . . . pages. The fifth resource is used in 5th, 17th, 25th, 37th, 45th, 57th, 65th, 77th, 85th, 97th, 105th, . . . pages. The sixth resource is used in 6th, 14th, 26th, 34th, 46th, 54th, 66th, 74th, 86th, 94th, 106th, 114th . . . pages. The seventh resource is used in 8th, 16th, 28th, 36th, 48th, 56th, 68th, 76th, 88th, 96th, 108th, . . . pages. The eighth resource is used in 9th, 29th, 49th, 69th, 89th, 129th, 149th, 169th, 189th, . . . pages. The ninth resource is used in 11th, 31st, 51st, 71st, 91st, 111th, 131st, 151st, 171st, 191st, 211th, . . . pages. The tenth resource is used in 13th, 19th, 33rd, 39th, 53rd, 59th, 73rd, 79th, 93rd, 99th, 113th, 119th, . . . pages.

The resource use information shown in FIG. 8 is displayable, for example, on the display apparatus 14. Moreover, the resource use information may be writable in the auxiliary storage apparatus 12, or the recording medium such as the CD-R/RW inserted into the disk drive 13.

<5.2 Part Use Information Obtaining Processing>

Figure 9:
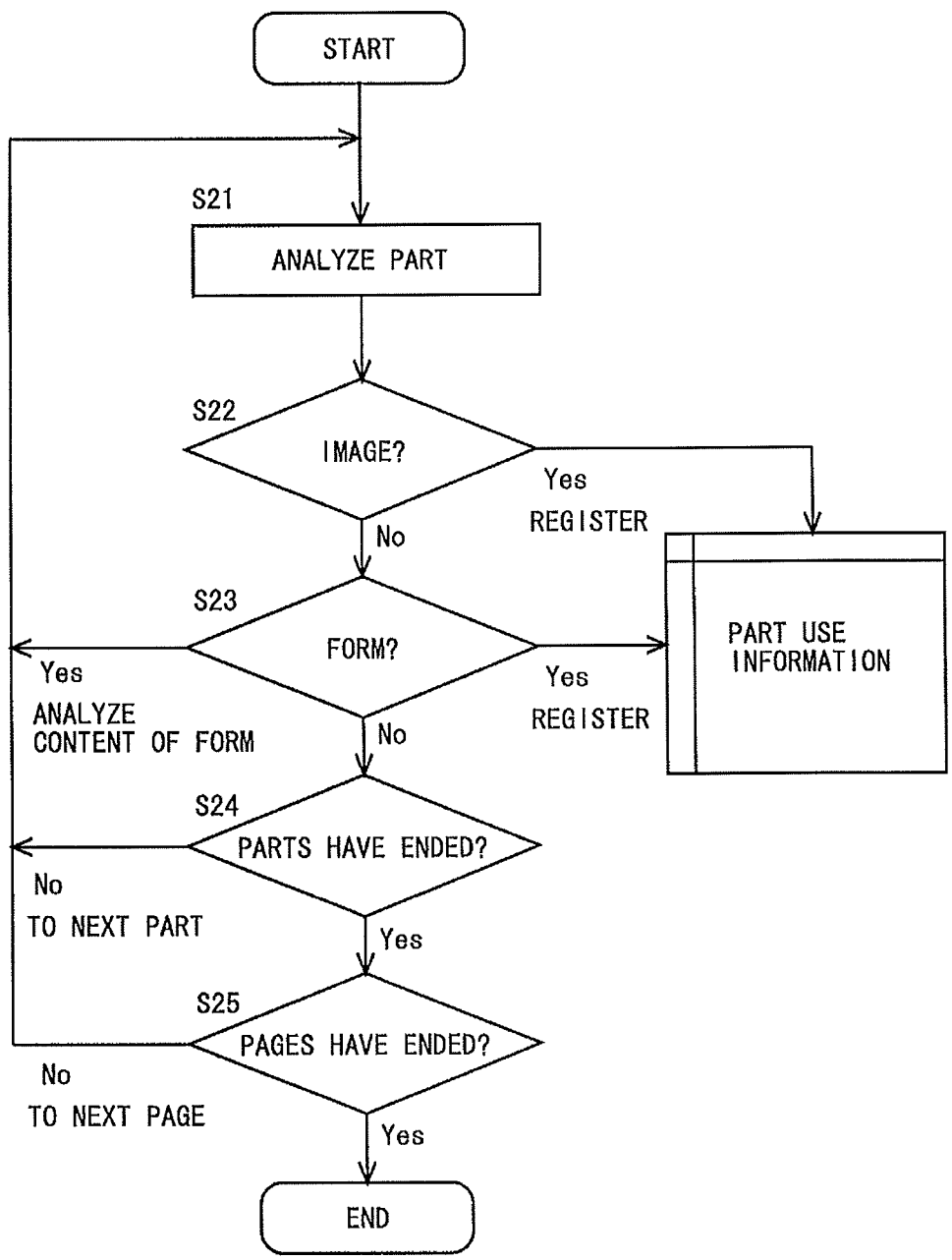
FIG. 9 is a flowchart showing one example of a processing procedure of part use information obtaining processing in the embodiment.
Figure 14:
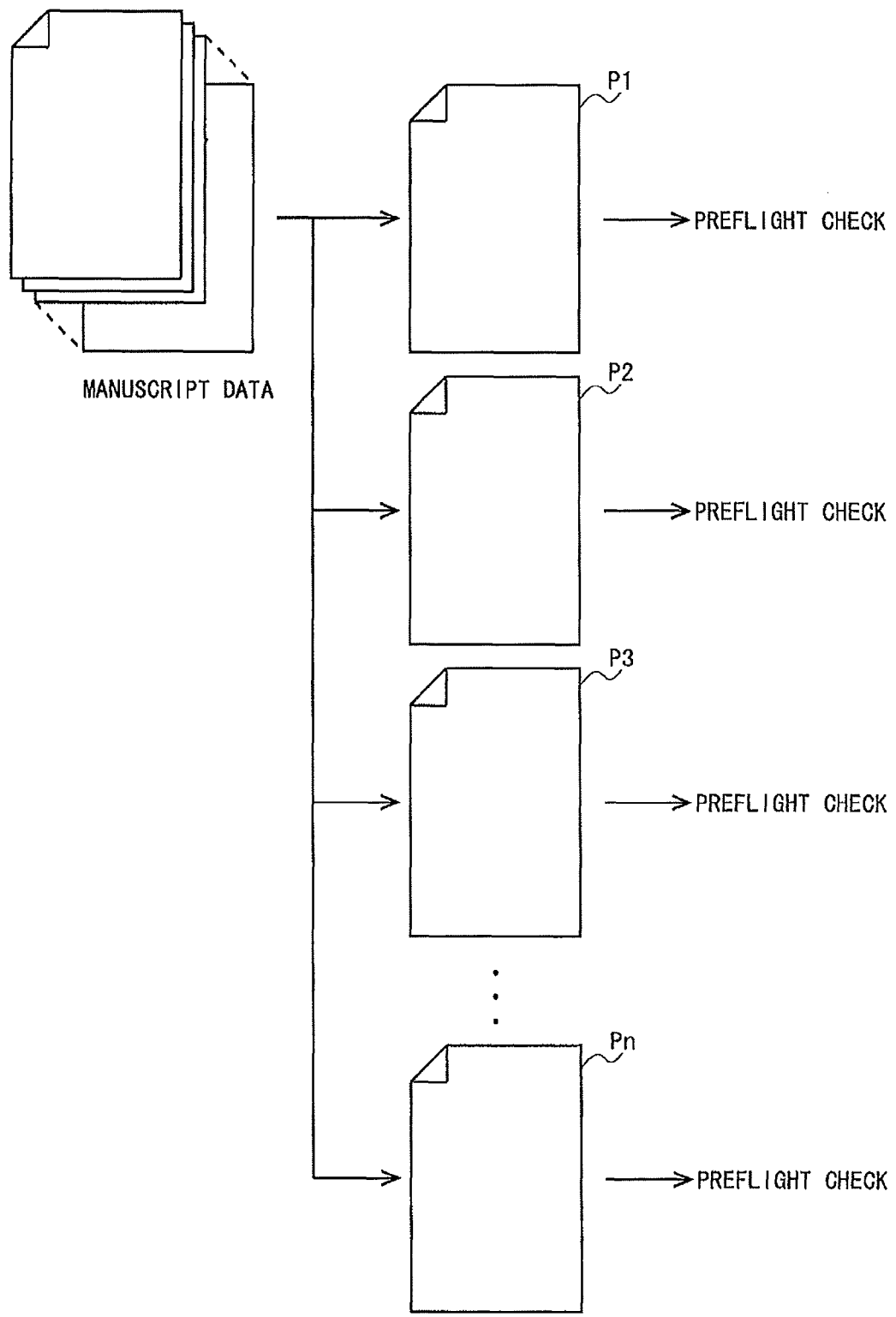
FIG. 14 is a schematic diagram for describing problems in the related art.

FIG. 9 is a flowchart showing one example of a procedure of the part use information obtaining processing in the present embodiment. In the part use information obtaining processing, analysis of the part is performed for each of the parts in each of the pages (step S21). In the part analysis in step S21, whether or not the part to be analyzed is the fixed part (image or form) is determined. Thereby, the processing objects in subsequent steps are the fixed parts, and the parts other than the fixed parts (that is, the variable parts) are excluded from the processing objects.

Next, whether or not the part to be analyzed is an image is determined (step S22). If the part to be analyzed is an image, information indicating that the part is an image and other various types of information of the part are registered as the part use information.

Next, whether or not the part to be analyzed is a form is determined (step S23). If the part to be analyzed is a form, information indicating that the part is a form and other various types of information of the part are registered as the part use information. Moreover, if the part to be analyzed is a form, analysis of a content of the form (part) is performed (step S21).

In step S24, if the information of all the parts in the page to be analyzed has been analyzed, the processing goes to step S25, and if the information of all the parts has not been analyzed, the next part is analyzed.

In step S25, if the parts have been analyzed in all the pages, the part use information obtaining processing ends, and if the parts have not been analyzed, the parts are analyzed in the next page.

FIG. 10 is a diagram showing one example of the part use information obtained by the part use information obtaining processing. For convenience, a portion of the part use information is shown. Meanings of terms in FIG. 10 are as follows.

"TotalPage" indicates a total number of pages of the variable manuscript data. In this case, it is 20000 pages.

"TotalForm" is a number of types of the forms used in the variable manuscript data. In this case, it is 279.

"TotalImage" indicates a number of types of the images used in the variable manuscript data. In this case, it is 1762.

"ScanNestLevel" indicates a maximum number of hierarchies of the forms in the variable manuscript data. In this case, it is three hierarchies.

"SerialNumber" indicates a serial number given to each of the parts. "SerialNumber" is not obtained from PDL indicating the variable manuscript data, but is given in the sub-preflight check unit 121 for convenience. In place of "SerialNumber", another number is given to each of the parts. Alternatively, "SerialNumber" may not be given.

"XObjectID" indicates an ID of each of the parts. In this case, it indicates reused part information regarding the two parts, whose IDs are 8 and 9, respectively. Hereinafter, the part whose ID is X is referred to as a "part of ID=X".

"XObjectType" indicates a type of each of the parts. Both the parts of ID=8, 9 are of the form.

"RecycleCount" indicates a number of times of use of each of the parts. In this case, in the variable manuscript data, the part of ID=8 is used only once, and the part of ID=9 is used 100 times.

"XObjectSize" indicates a size of each of the parts, "XObjectWidth" indicates a length in a horizontal direction of each of the parts, and "XObjectHeight" indicates a length in a vertical direction of each of the parts. A unit of the respective lengths is pixel. "XObjectSize" is a product of "XObjectWidth" and "XObjectHeight". As to the part of ID=8, "XObjectSize", "XObjectWidth", and "XObjectHeight" are 263032 pixels, 586 pixels, and 449 pixels, respectively. As to the part of ID=9,"XObjectSize", "XObjectWidth", and "XObjectHeight" are 2487171 pixels, 574 pixels, and 432 pixels, respectively.

"UsePageNum" indicates a total number of pages where each of the parts is used. If the part is not used a plurality of times in one page, "UsePageNum" is equal to "RecycleCount". The part of ID=8 is used only in one page, and the part of ID=9 is used in 100 pages.

"ExceCountList" indicates a number of the page where each of the parts is used, and a number of times when the part is used in the page. In [a b], "a" indicates the number of the page where each of parts is used, and "b" indicates the number of times when the part is used in the page. The part of ID=8 is used once in the 1st page. The part of ID=9 is used once in each of the 1st, 3rd, 5th, 7th, 9th, 11th, 13th, 15th, 17th, 19th, . . . pages.

"ParentXObjectNum" indicates a number of parents (refer to parts of an upper hierarchy) of each of the parts. In the part of ID=8, no parent exists. In the part of ID=9, 100 parents exists.

"ParentXObjectList" indicates an ID of the parent of each of the parts, and a number of times that the part is used as a child of the parent (refers to a part of a lower hierarchy). In [c d], c indicates the ID of the parent of each of the parts, and d indicates the number of times when the part is used as the child of the parent. The part of the ID=9 is used once as the child of each of the parts of ID=8, 986, 1024, 2759, 4338, 4436, 4459, 4523, 4560, 4597, . . . As to the part whose parent does not exist, "ParentXObjectList" does not exist.

While only the portions regarding the parts of ID=8, 9 have been described in the part use information obtained by the part use information obtaining processing have been described in the foregoing, the contents of the part use information regarding the other parts are similar. Not all the various parameters of the part use information described here are essential for the present invention. The reused part information only needs to include at least "XObjectID" and "ExceCountList".

The part use information shown in FIG. 10 is displayable, for example, on the display apparatus 14. Moreover, the resource use information may be writable in the auxiliary storage apparatus 12 or the recording medium such as the CD-R/RW inserted into the disk drive 13.

<6. Object Page Information Obtaining Processing>

FIG. 11 is a flowchart showing a procedure of the processing for obtaining the object page information (hereinafter, referred to as "object page information obtaining processing"). In object page information obtaining processing, processing for obtaining information indicating the object pages to be subjected to the preflight check determined in view of the resource use information (hereinafter, referred to as "resource object page information) is performed (step S31). Hereinafter, this processing is referred to as "resource object page information obtaining processing". The resource object page information is obtained as information indicating numbers of any one or more pages in which each of the resources indicated by the resource use information is used. The resource object page information is, particularly, obtained as information indicating a number of any one of the pages in which each of the resources indicated by the resource use information is used.

The resource object page information is, more particularly, obtained as information indicating a number of the first page in which each of the resources indicated by the resource use information is used (hereinafter, referred to as a "resource first use page"). For example, the resource object page information is obtained as information indicating the numbers of the resource first use pages 1, 2, 3, 4, 5, 6, 8, 9, 11, 13 regarding the first to tenth resources in the resource use information shown in FIG. 8.

Next, processing for obtaining information indicating the object page to be subjected to the preflight check determined in view of the part use information (hereinafter, referred to as "part object page information") is performed (step S32). Hereinafter, this processing is referred to as "part object page information obtaining processing"). The part object page information is obtained as information indicating numbers of any one or more of the pages in which each of the parts indicated by the part use information is used. The part object page information is, particularly, obtained as information indicating a number of any one of the pages in which each of the parts indicated by the part use information is used. The part object page information is, more particularly, obtained as information indicating a number of the first page in which each of the parts indicated by the part use information is used (hereinafter, referred to as a "part first use page").

FIG. 12 is a diagram showing one example of the part object page information in the present embodiment. "Characteristic Page count" indicates a total number of the part first use pages regarding each of the parts indicated by the part use information. Since in some cases, the plurality of parts are first used in the same page, "Characteristic Page count" is not more than a total number of the part types. In this case, the total number of the part first use pages is 40. The part first use pages are 1, 2, 4, 6, 8, 10, 12, 14, 16, 18, 20, 22, 26, 28, 30, 32, 34, 37, 38, 40, 42, 44, 46, 50, 62, 73, 74, 76, 86, 88, 90, 92, 94, 98, 110, 121, 122, 126, 128, and 134. The part object page information may not include "Characteristic Page count".

While in this case, the part object page information obtaining processing is performed after the resource object page information obtaining processing, the order may be reverse. Moreover, the resource object page information obtaining processing and the part object page information obtaining processing may be performed in parallel.

In addition to the part object page information, information in which a portion of the part use information is sorted, based on a predetermined reference (hereinafter, referred to as "part related information") as shown in FIG. 13 may be obtained. Meanings of respective terms in FIG. 13 are as follows.

[XO ID] corresponds to the "XObjectID". (F) corresponds to the "XObjectType". (1) indicates a form, and (0) indicates an image. "PageRC" corresponds to the "UsePageNum". "AllRC" corresponds to the "RecycleCount". "Size" corresponds to the "XObjectSize" "Parent" corresponds to the "ParentXObjectNum". "Nest" indicates a hierarchy where each of the parts is located. When "Nest" is 0, it indicates that the part is located in a top hierarchy (first hierarchy), in other words, that no parent exists. If "Nest" is 1, it indicates that the part is located in a lower hierarchy of the first hierarchy (second hierarchy), in other words, that there exists a parent. If "Nest" is 2, it indicates that the part is located in a lower hierarchy of the second hierarchy (third hierarchy), in other words, that a parent of the parent exists.

The information regarding each of the parts in the part related information is sorted in a descending order, based on "Size". The reference of the sort is not limited to "Size". The above-described part related information is displayed, for example on the display apparatus 14. More particularly, the part related information can be displayed on the display apparatus 14 together with the preflight result and the like. This allows the operator to preferentially check the preflight result of the part considered to have large influence on a printing result, such as the part having a large size and the part having a large number of times of reuse. The part related information may be writable in the auxiliary storage apparatus 12 or the recording medium such as the CD-R/RW inserted into the disk drive 13.

After the resource object page information and the part object page information are obtained, the object page information is obtained, based on these types of information. Specifically, a union of the resource first use pages and the part first use pages is the object pages (step S33). In the present embodiment, the resource first use pages are the 1st, 2nd, 3rd, 4th, 5th, 6th, 8th, 9th, 11th, 13th pages (a total of 10 pages), and the part first use pages are the 1st, 2nd, 4th, 6th, 8th, 10th, 12th, 14th, 16th, 18th, 20th, 22nd, 26th, 28th, 30th, 32nd, 34th, 37th, 38th, 40th, 42nd, 44th, 46th, 50th, 62nd, 73rd, 74th, 76th, 86th, 88th, 90th, 92nd, 94th, 98th, 110th, 121st, 122nd, 126th, 128th, and 134th (a total of 40 pages). Thus, the object pages of the present embodiment are the 1st, 2nd, 3rd, 4th, 5th, 6th, 8th, 9th, 10th, 11th, 12th, 13th, 14th, 16th, 18th, 20th, 22nd, 26th, 28th, 30th, 32nd, 34th, 37th, 38th, 40th, 42nd, 44th, 46th, 50th, 62nd, 73rd, 74th, 76th, 86th, 88th, 90th, 92nd, 94th, 98th, 110th, 121st, 122nd, 126th, 128th, and 134th page (a total of 45 pages). According to the steps S31 to S33, the object page information is obtained.

Since the resource object page information and the part object page information are obtained from the resource use information and the part use information, respectively, in step 33, the object page information may be directly obtained from the resource use information and the part use information.

<7. Action>

In the present embodiment, the preflight check is performed only on the object pages obtained as the union of the pages in which the respective fixed parts and resources are used first. That is, by performing the preflight check to the object pages, the preflight check of all the types of fixed parts and resources is performed. Since for the fixed parts or resources to which the preflight check is performed once, the preflight check need not be performed again even if the parts or resources are used later, in the present embodiment, the preflight check need not be performed to the pages other than the object pages.

In the present embodiment, some of the variable parts in the variable manuscript data, specifically, only the variable parts used in the object pages are subjected to the preflight check. For example, when the various types of variable parts each include characters, contents indicated by the characters are different on a basis of record, and on the other hand, a character size, a font, a color and the like are basically the same among the records. Moreover, the character size, font, color and the like are determined, depending on the resource. Thus, although the contents indicated by the characters included in the variable parts are different in the records, for the character size, font, color and the like, if the preflight check is performed to one of the records including the various types of variable parts (e.g., the first record, which is surely included in the object pages), the preflight check can be considered to have been performed to the same types of variable parts included in the other records.

Moreover, in the present embodiment, while the sub-preflight check is performed to all the pages, the error detection of the check object information or the like is not performed in the sub-preflight check, which is different from the preflight check. The error detection of the check object information in the preflight check is relatively heavy processing, while the processing of the sub-preflight check to all the pages is far lighter than the processing of the preflight check to all the pages. Moreover, the object page information obtaining processing is far lighter than the processing of the preflight check to all the pages. Thus, a sum of time each required for the sub-preflight check, the object page information obtaining processing and the preflight check in the present embodiment is shorter than time required for the conventional preflight check to all the pages.

<8. Advantages>

As described above, according to the present embodiment, the preflight check is performed only on the object pages (in the present embodiment, for example, 45 pages) of all the pages (in the present embodiment, for example, 20000 pages) of the variable manuscript data. Thus, the preflight check of all the types of fixed parts and resources used in the variable manuscript data can be performed while reducing the number of the pages to be subjected to the preflight check as compared with the related art. This enables the preflight check to be performed at higher speed than that in the related art.

Moreover, according to the present embodiment, the object pages are the union of the resource first use pages and the part first use pages. Since in the first half of the records (particularly, the first record and the like), both the resources and the parts are often used first, the resource first use page and the part first use page overlap each other. Thus, setting the union of the resource first use pages and the part first use pages as the object pages can reduce the number of the object pages, as compared with the case where the union of any of the pages in which the resource is used and any of the pages in which the part is used is set as the object pages. This can achieve further speeding-up of the preflight check.

<9. Others>

As described previously, since the preflight check is not performed to the variable parts used in the pages other than the object pages in the main preflight check unit 123, easier check than the preflight check performed in the main preflight check unit 123 may be performed to the pages other than the object pages. This can increase the check accuracy to each part in the above-described embodiment while speeding up the preflight check, as compared with the related art. While the present invention has been described in detail in the foregoing, the above description is not limitative but illustrative in all points. It should be understood that other changes and modifications can be devised without departing from the scope of the present invention.

According to the present invention, the printing control apparatus, the recording medium having recorded thereon the printing control program and the printing control method that enable the preflight check to be performed at higher speed than that in the related art in the variable printing can be provided.

The present application claims the priority right based on Japanese Patent Application No. 2012-71071 titled "Printing Control Apparatus, Printing Control Program, and Printing Control Method" filed in Japan on Mar. 27, 2012, the subject matter of which is hereby incorporated herein by reference.

What is claimed is:

1. A printing control apparatus for performing preflight check on manuscript data made up of a plurality of pages in variable printing, the apparatus comprising:
   a use information obtainment unit for obtaining first use information indicating pages in which a reusable part in the manuscript data is used, the reusable parts being each an image or a form, and second use information indicating pages having the same resource content in the manuscript data;
   an object page determination unit for determining object pages to be subjected to the preflight check from the plurality of pages, based on the first use information and the second use information;
   wherein the object page determination unit sets, as the object pages, a union of any page that one of the parts indicated by the first use information is used, and any page that one of the resources indicated by the second use information is used;
   an object page check unit for performing the preflight check on the object pages; and
   an output unit for outputting a result of the preflight check.

2. The printing control apparatus according to claim 1, wherein the object page determination unit sets, as the object pages, a union of a page in which one of the parts indicated by the first use information is first used, and a page in which one of the resources indicated by the second use information is first used.

3. A non-transitory computer-readable recording medium having recorded thereon a printing control program, when executed using a memory by a CPU of a computer for performing preflight check on manuscript data made up of a plurality of pages in variable printing, causing the CPU to perform:
   a use information obtainment step of obtaining first use information indicating pages in which a reusable part in the manuscript data is used, the reusable parts being each an image or a form, and second use information indicating pages having the same resource content in the manuscript data;
   an object page determination step of determining object pages to be subjected to the preflight check from the plurality of pages, based on the first use information and the second use information;
   wherein in the object page determination step sets, as the object pages, a union of any page that one of the parts indicated by the first use information is used, and any page that one of the resources indicated by the second use information is used;
   an object page check step of performing the preflight check on the object pages; and
   an output step of outputting a result of the preflight check.

4. The non-transitory computer-readable recording medium according to claim 3, wherein in the object page determination step, as the object pages, a union of a page in which one of the parts indicated by the first use information is first used, and a page in which one of the resources indicated by the second use information is first used is set.

5. A printing control method carried out by a computer for performing preflight check on manuscript data made up of a plurality of pages in variable printing, wherein the computer performs:
   a use information obtainment step of obtaining first use information indicating pages in which a reusable part in the manuscript data is used, the reusable parts being each an image or a form, and second use information indicating pages having the same resource content in the manuscript data;
   an object page determination step of determining object pages to be subjected to the preflight check from the plurality of pages, based on the first use information and the second use information;
   wherein in the object page determination step sets, as the object pages, a union of any page that one of the parts indicated by the first use information is used, and any page that one of the resources indicated by the second use information is used;
   an object page check step of performing the preflight check on the object pages; and
   an output step of outputting a result of the preflight check.

6. The printing control method according to claim 5, wherein in the object page determination step, as the object pages, a union of a page in which one of the parts indicated by the first use information is first used, and a page in which one of the resources indicated by the second use information is first used is set.

7. The printing control method according to claim 5, wherein the computer comprises:
   a use information obtainment unit for obtaining said first use information indicating pages in which a reusable part in the manuscript data is used, the reusable parts being each an image or a form, and said second use information indicating pages having the same resource content in the manuscript data;
   an object page determination unit for determining said object pages to be subjected to the preflight check from the plurality of pages, based on the first use information and the second use information;

an object page check unit for performing the preflight check on the object pages; and an output unit for outputting a result of the preflight check.

8. The printing control method according to claim 7, wherein the object page determination unit sets, as the object pages, a union of any page that one of the parts indicated by the first use information is used, and any page that one of the resources indicated by the second use information is used.

9. The printing control method according to claim 8, wherein the object page determination unit sets, as the object pages, a union of a page in which one of the parts indicated by the first use information is first used, and a page in which one of the resources indicated by the second use information is first used.

* * * * *